United States Patent

Hansen et al.

[15] 3,668,306

[45] June 6, 1972

[54] AUTOMATIC HUE CONTROL FOR A TELEVISION RECEIVER

[72] Inventors: Robert B. Hansen, Arlington Heights; Thomas W. Ivas, Evergreen Park; William H. Slavik, Oak Lawn, all of Ill.

[73] Assignee: Motorola, Inc., Franklin Park, Ill.

[22] Filed: May 19, 1969

[21] Appl. No.: 825,775

[52] U.S. Cl. ........................................................ 178/5.4 HE

[51] Int. Cl. ........................................................ H04n 9/12

[58] Field of Search ............ 178/5.4 HE, 5.4 R, 5.4 F, 5.4 H, 178/5.4 PD, 5.4 ML, 5.4 AC

[56] References Cited

UNITED STATES PATENTS

| | | | |
|---|---|---|---|
| 3,456,068 | 7/1969 | Wilhelmy | 178/5.4 |
| 2,888,514 | 5/1959 | Pritchard | 178/5.4 |
| 2,976,351 | 3/1961 | Loughlin | 178/5.4 |
| 3,525,802 | 8/1970 | Whiteneir, Jr. | 178/5.4 |

OTHER PUBLICATIONS

" Automatic Controls For Color Television" Wiencek, Electronics, 5-1959.

*Primary Examiner*—Richard Murray
*Assistant Examiner*—Peter M. Pecori
*Attorney*—Mueller, and Aichele

[57] ABSTRACT

A color television receiver providing for the direct demodulation of the red, blue and green color representative signals includes an additional pair of hue control demodulators for demodulating color difference signals on opposite sides of the I-axis by equal amounts. The outputs of the hue control demodulators are inverted with respect to one another and are supplied to an adder, which provides a DC control voltage indicative of the relative difference in the amplitudes of the signals obtained from the hue control demodulators. This control voltage then is supplied to a DC controlled variable hue control circuit which shifts the relative phase between the color sync oscillator output and the subcarrier to the demodulators by an amount sufficient to maintain the average outputs of the two hue control demodulators equal in amplitude.

16 Claims, 3 Drawing Figures

INVENTORS
ROBERT B. HANSEN
THOMAS W. IVAS
WILLIAM H. SLAVIK

BY Mueller, Aichele & Rauner
ATTORNEYS.

INVENTORS
ROBERT B. HANSEN
THOMAS W. IVAS
WILLIAM H. SLAVIK
BY Mueller, Aichele & Rauner
ATTORNEYS

AUTOMATIC HUE CONTROL FOR A TELEVISION RECEIVER

BACKGROUND OF THE INVENTION

The NTSC color television signal presently in use includes a wide-band brightness or luminence (Y) signal and a modulated subcarrier signal of approximately 3.58 mhz. The subcarrier signal is phase and amplitude modulated by color difference signals (R-Y, B-Y, and G-Y), so that phases of the subcarrier each represent the hue of an image portion and the subcarrier amplitude at that phase represents the saturation of that hue. A monochrome receiver visibly reproduces only the Y component.

The usual color receiver includes color demodulators for synchronously recovering the color difference signals which then can be added to the Y signal for developing the red, blue and green representative signals to be reproduced by the cathode ray tube. Other receivers include direct demodulators for directly developing the red, blue and green color representative signals, thereby avoiding the separate recovery and combination of the brightness signal with the demodulated color difference signals.

In either of these types of demodulators, however, it is necessary to provide a properly phased reference signal of the subcarrier frequency in order to produce output color representative signals at the proper hues. In the N.T.S.C. system, this is accomplished by including in the television signal bursts of a reference signal of the same frequency as the color subcarrier and having a particular phase relationship with the different phases of the subcarrier representing the different hues. These reference signal bursts are recovered at the receiver by a gating action and are applied to an automatic frequency control circuit associated with the local oscillator at the receiver. The recovered bursts and the output signal from the oscillator are compared to develop a control signal which is utilized to control the oscillator, so that its output signal is a continuous wave of the proper frequency and phase to be used as a demodulating signal for the color subcarriers. Since the burst theoretically occupies a position having a precise phase relationship with the modulated subcarrier signals, a local oscillator which is phase locked to this burst signal should provide an accurate reference signal for demodulating the correct hues of the transmitted signal.

In actual practice, however, it has been found that the transmitted burst does not always occupy the same phase relationship with the modulated color difference signals. This occurs due to the fact that the burst signal is not carried through the entire chain of signals at the transmitter but is reinserted into the signal prior to transmission thereof. If accurate control is not obtained over the precise phase of the reinserted burst, a deviation in the correct hue of the demodulated color difference signals occurs at the receiver. As a result, shifts in hue may occur during received programming when changes are made from camera to camera, station to station, from live telecasts to tape telecasts to film, or from network transmission to local transmission. Any time an improper phase relationship exists between the burst signal and the remainder of the transmitted signal for any reason, a shift in the hue of the reproduced colors at the television receiver occurs. For most objects, such a shift in hue or color is not detectable by the viewer since there is no reference based on previous information with which the viewer may make an exact comparison. If, however, the scene being reproduced includes flesh tones, immediately a viewer detects errors in the color reproduction since there is a pre-established reference for such flesh tones in the mind of the viewer. As a consequence, it is necessary to readjust the hue control establishing the phase of the local oscillator in order to reproduce the flesh tones accurately. If another shift in the phase relationship of the burst signal occurs, it again is necessary to readjust the hue control in order to cause the reproduced picture to be satisfying to the viewer. Thus it is desirable to provide a television receiver in which changes in the phase relationship of the burst signal can be automatically compensated at the receiver.

It has been established that the acuity of the human eye to colors is greater for colors reproduced along an orange-cyan color axis than for colors lying along any other color axis, with the minimum acuity of the eye being for colors lying along a generally green-purple axis. The maximum acuity axis has been identified or defined as the I-axis in the N.T.S.C. signal, with the minimum acuity axis being at right angles to the I-axis and being identified as the Q-axis. Since the flesh tones or colors to which observers are most sensitive lie along the maximum acuity or I-axis, a means for correctly determining the phase of the I-axis in the transmitted signal and causing the output of the local oscillator to be at a predetermined phase with respect to the I-axis should result in satisfactory color reproduction, irrespective of the location of the burst signal. Thus it is desirable to maintain the proper phase relationship between color signals received on the I-axis and the output of the local reference oscillator to provide for accurate reproduction of the hues of the broadcast signal.

SUMMARY OF THE INVENTION

Accordingly it is an object of this invention to automatically control the hue of a color television receiver.

It is an additional object of this invention to automatically control the hue of a color television receiver by monitoring the received signal and maintaining a predetermined phase relationship between a particular phase of the received signal and the receiver color sync oscillator.

It is a further object of this invention to automatically control the hue of a color television receiver by utilizing a pair of phase detectors responsive to signals displaced equally on each side of the I-axis to control the phase of the output of the color sync oscillator so that the outputs of the two-phase detectors are maintained substantially equal.

In accordance with a preferred embodiment of this invention, a color television receiver for receiving composite signals, comprising brightness signal components of a television image and a subcarrier signal modulated by color difference signals representing hue and saturation of the image at different phases of the subcarrier, includes, in addition to the normal color demodulators, first and second hue control demodulators. The modulated subcarrier signal is applied to the hue control demodulators in addition to the normal color demodulators, and the first and second hue control demodulators also are supplied with demodulation reference signals at predetermined phases lying in equal amounts on each side of a particular phase exhibiting a characteristic of color predominance in the received signal. The outputs of the two hue control demodulators are inverted relative to one another and are added to produce a control voltage, the value of which is dependent upon the relative magnitudes of the outputs of the demodulators. This control voltage then is utilized to maintain a predetermined phase relationship between the modulated subcarrier signal at the particular phase and the local oscillator signal, or reference.

DETAILED DESCRIPTION

Figure 1:
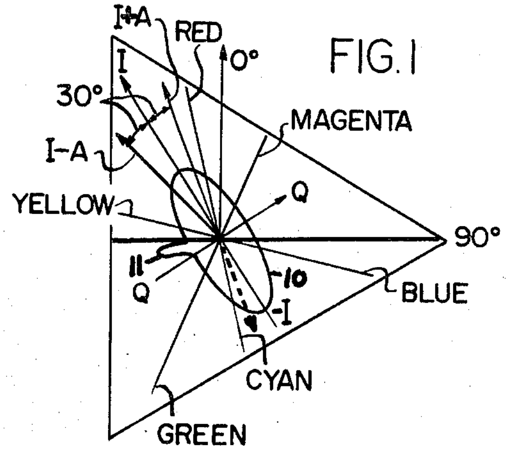
FIG. 1 is a vector diagram showing the relative phases of the various hues in the N.T.S.C. signal, with a vectorscope plot taken over a prolonged period of time showing the characteristics of color predominance of a transmitted television signal.

Referring now to FIG. 1, there is shown a conventional vector diagram of the relative phases for the various hues which are incorporated into the N.T.S.C. color television subcarrier signal. In interpreting a plot made on such a vector diagram, the phase angle of the vector provides an indication of the hue, while the subcarrier amplitude, when considered along with the corresponding luminance level, provides an indication of the saturation. Thus, any color can be represented by a vector at a particular phase in the diagram while the saturation of that color may be represented by the length of the vector.

The vectors for representative colors are shown in FIG. 1 and are labeled to indicate their relative angular positions to one another. In addition, the maximum acuity axis I and the minimum acuity axis Q have been shown along with the vector for the burst signal used in conjunction with the N.T.S.C. transmitted signal. In observing the color information from broadcast television shows, a vectorscope having plotted thereon the vector diagram shown in FIG. 1 was utilized to monitor the received signals over prolonged periods of time (in excess of 1 hour). During these periods, the screen of the vectorscope was continually exposed to a photographic film to produce a time exposure of the color information being received. This exposure produced the envelope 10 shown in FIG. 1. The envelope 10 shows that there is a predominance of color information along the maximum acuity axis I and that this information is balanced equally on both sides of the axis I. In other words, there tends to be a peaking of energy or a balance of the color signal over a period of time in the region surrounding the I-axis. This peaking or balance also exists for much shorter periods of time, of the order of 1 to 10 seconds.

The projection 11 on the generally cigar shaped envelope 10 is due to the transmitted burst component and is not a part of the normal transmitted color image information. From an examination of FIG. 1, it would appear that a system responsive to this predominance of color information could provide automatic hue control, irrespective of any deviations in the phase of the burst component 11 relative to the phase of the color information peaking along the I axis. Such a system is shown in FIG. 2.

Figure 2:
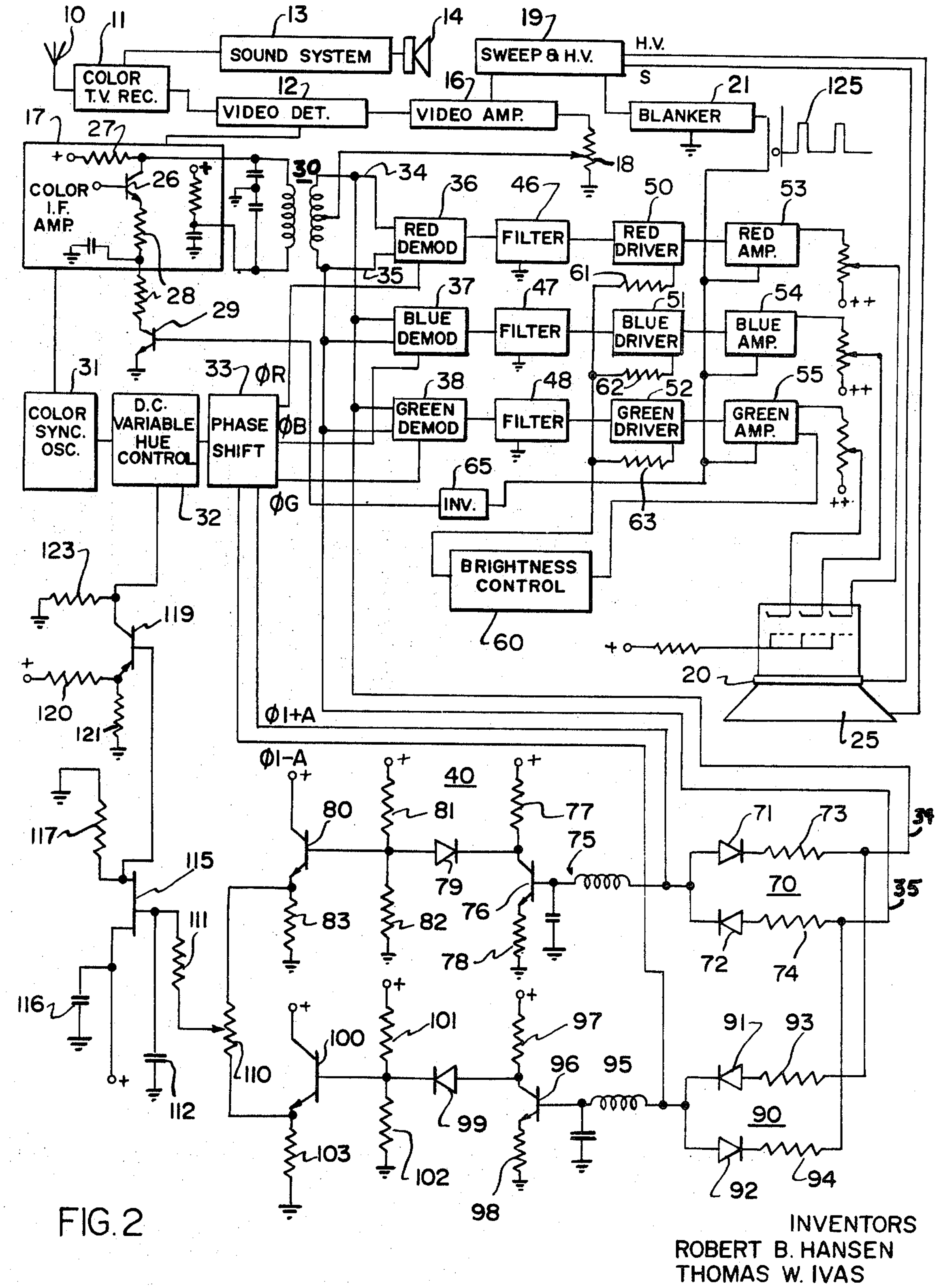
FIG. 2 is a schematic diagram, partially in block form, of a television receiver incorporating an automatic hue control circuit in accordance with a preferred embodiment of this invention.

Referring now to FIG. 2, there is shown a color television receiver 11 coupled to a suitable antenna 10 for receiving a composite television signal and for selecting, amplifying, and converting the radio frequency signal to IF frequency for application to a video detector 12. The color television receiver 11 also is coupled to a sound system 13 which demodulates and amplifies the usual 4.5 mhz sound subcarrier for reproduction by a speaker 14 as the audio signals of the received composite signal supplied by the antenna 10 to the receiver 11.

The video detector 12 is coupled to a video amplifier 16 and a color IF amplifier 17 which are used to process the brightness and modulated chroma signal components of the received composite signals, respectively. The video amplifier 16 supplies signals to a sweep and high voltage circuit 19, which has an output connected to the deflection yoke 20 located on the neck of a three-gun color cathode ray tube 25. The sweep and high voltage system 19 also provides a high voltage for the screen of the shadow mask of the cathode ray tube 25 in a conventional manner.

In the color IF amplifier stage 17 there is a band-pass filter network for selecting the color subcarrier at 3.5 mhz and its associated sidebands; and the final or band-pass amplifier in the IF amplifier stage 17 is in the form of an NPN transistor 26, having its collector connected to a source of positive potential through a collector resistor 27 and having its emitter connected through a pair of emitter-resistors 28 to the collector of a second NPN transistor 29, the emitter of which is connected to ground. The transistor 29 conducts to provide a path to ground for the emitter of the transistor 26. A gain or color intensity control also is provided in the amplifier 17; and the output of the amplifier 17 is obtained from the collector of the transistor 26, which furnishes a selected amplitude of the chroma subcarrier signal to the primary winding of an output transformer 30.

An output of the IF amplifier 17, taken from an earlier stage of the amplifier, is coupled to a color synchronizing oscillator 31 which selects the burst signals appearing on the "back porch" of the horizontal synchronizing pulses in order to develop a color reference signal of 3.58 mhz in synchronism with the burst signals. This color reference signal is supplied to the input of a direct current controlled variable hue control circuit 32, which may be any desired type of DC-controlled phase shifting circuit, with the output of the hue control circuit 32 being supplied to a phase shifting circuit 33 which develops the different phases for synchronous demodulation of the chroma or color signals.

Three of the outputs of the phase shift circuit 33 are identified as $\phi R$, $\phi B$ and $\phi G$ to designate the required phases for demodulating the red, blue and green colors of the modulated chroma signal components, respectively. In addition, two other outputs of the phase shift circuit are identified as $\phi I+A$ and $\phi I-A$ to designate phases on each side of the I-axis for developing the proper phases of the reference signal for demodulating the two phases utilized in an automatic hue control circuit 40, the output of which is applied as the DC control potential to the variable hue control phase shift circuit 32.

The output of the video amplifier 16 also is supplied through a contrast control circuit 18, shown in the form of a potentiometer but which also could be an automatic contrast control circuit, with the output of the contrast control circuit 18 being supplied to the center tap of the secondary winding of the transformer 30. The luminance or brightness signal obtained from the output of the contrast control potentiometer 18 may extend in frequency up to or into the chroma subcarrier sidebands.

The secondary winding of the transformer 30 has one output lead 34 and a second output lead 35 with both of these leads carrying the same brightness component with respect to ground since the brightness component is applied to the center tap of the secondary winding of the transformer 30. The lead 34 carries the modulated chroma subcarrier of one phase while the lead 35 carries the modulated chroma subcarrier of the opposite phase with respect to ground. As stated previously, the chroma or color subcarrier is phase modulated to represent hue and is amplitude modulated to represent saturation. The leads 34 and 35 each are coupled to the three direct color signal demodulators 36, 37 and 38. In addition, the red, blue and green phase reference signals from the output of the color sync oscillator phase shifting circuit 33 are applied to the demodulators 36, 37 and 38, respectively, in order to provide direct demodulation of the signals applied to the inputs of these demodulators.

The outputs of the demodulators 36, 37 and 38 are supplied to associated filters 46, 47 and 48, which trap the 3.58 reference signal and pass the desired red, blue and green video output signals to three driver circuits 50, 51 and 52, respectively. Three amplifier circuits, 53, 54 and 55 are driven by the outputs of the driver circuits, and the output of each amplifier circuit is coupled through a variable resistor to the corresponding cathode of the three beam cathode ray tube 25. Associated grids of these cathodes are coupled to a suitable bias source, and the tube 25 operates in accordance with well-known shadow mask principles to reproduce a monochrome or full-color image in accordance with the video drive signals applied to it.

In order to provide brightness control for the television receiver, the output taken from the green video amplifier 55 may be supplied to an automatic brightness control circuit 60, the output of which then is supplied to the driver circuits 50, 51 and 52 through coupling resistors 61, 62 and 63 to control the DC operating voltage level supplied to the driver stages 50, 51 and 52 respectively. This in turn varies the black level or brightness of the signal applied by the amplifiers 53, 54 and 55 to the corresponding cathodes in the cathode ray tube 25.

In the receiver generally described so far, there may be additional circuitry which is known and which has not been disclosed in detail in order to simplify this disclosure. For example, there may be a gated automatic gain control system, a color killer system for interrupting the amplifier 17 in the absence of the color signal, as well as other circuitry now known in commercially produced color television receivers. It further should be noted that it is preferrable for the video detector 12 to be direct current coupled through all of the succeeding amplifiers and demodulators directly to the cathodes of the picture tube 25 in order to maintain the DC component of the signals processed in the various translation paths.

In order to provide an automatic hue control which is not wholly dependent upon the phase of the burst signal, since the phase of this signal may vary in different transmissions relative to the phase of the predominance of color information, the automatic hue control circuit 40 has been provided. This automatic hue control circuit includes a pair of additional hue control demodulators 70 and 90. Each of these demodulators includes a first diode 71 or 91 connected in series with a resistor 73 or 93 between the input lead 34 and a filter 75 or 95, respectively. A second diode 72 or 92 is series-connected with a resistor 74 or 94 between the input lead 35 and the filter 75 or 95, respectively. It should be noted that the input signals applied to the demodulators 70 and 90 are the same modulated subcarrier signals which are applied to the red, blue and green demodulators 36, 37 and 38 respectively, but that the polarities of the diodes 71, 91 and 72, 92 are reversed with respect to one another so that the outputs of the demodulators will be inverted with respect to one another.

In order to demodulate the subcarrier signals applied to the demodulators 70 and 90 a signal of the subcarrier frequency and of phase $\phi I+A$, where A is 30° as may be seen in FIG. 1, is obtained from the output of the phase shifter circuit 33 and is applied to the junction of the diodes 71 and 72 with the filter 75. Similarly, a reference signal of the subcarrier frequency and of phase $\phi I-A$ is applied from the output of the phase shifter circuit 33 to the junction of the diodes 91 and 92 with the filter 95.

The filters 75 and 95 are roll-off filters for eliminating the 3.58 subcarrier signal and establish a proper video frequency band-path to integrate the signal portions comprising the brightness and saturation components conducted by the diodes 71, 72 and 91, 92.

Assume for purposes of the present illustration that the burst components for phase synchronizing the color sync oscillator 31 are in the proper phase relationship with the remainder of the signal components so that the I—A and I+A vectors, each 30° on opposite sides of the I-axis, are being demodulated to produce color representative signals of equal amplitudes. With a color television signal of the type shown in FIG. 1, having a predominance of color information symmetrically arranged about the I-axis, this operation will be true for a properly phased receiver. Thus, the filtered output signals from the demodulators 70 and 90 are applied to the bases of NPN amplifier transistors 76 and 96 respectively. The collectors of the transistors 76 and 96 are connected to a source of positive potential through collector resistors 77 and 97 in a conventional manner, and the emitters of these transistors are connected to ground through emitter resistors 78 and 98.

In each of the channels, the amplified demodulated output signals are applied from the collectors of the transistors 76 and 96 to half-wave rectifier diodes 79 and 99 respectively. The diodes 79 and 99, however, are poled in opposite directions so that the positive half-cycles of the waveforms appearing on the collector of the transistor 96 are passed by the diode 99, whereas the negative half-cycles of the waveforms appearing on the collector of the transistor 76 are passed by the diode 79. The waveforms appearing at the collectors of the transistors 76 and 96 are shown in solid lines in curves C and D of FIG. 4, with the waveform C being obtained from the collector of the transistor 96 and the waveform D being obtained from the collector of the transistor 76. It may be seen in FIG. 3 that these two waveforms C and D are displaced by 60° + 180°, due to the fact that the reference signals $\phi I-A$ and $\phi I+A$ each are displaced 30° on each side of the I-axis for a total displacement of 60°, and in addition the demodulators 70 and 90 produce outputs which are relatively inverted, i.e. 180° out of phase.

In order to establish the proper zero crossing level for operation of the diode 79, a voltage divider, consisting of a pair of resistors 81 and 82, is connected between the source of positive potential and ground, with the junction of the resistors 81, 82 being coupled to the anode of the diode 79. A similar voltage divider, consisting of a pair of resistors 101 and 102, is connected between the source of positive potential and ground, with the junction of the resistors 101, 102 being connected to the cathode of the diode 99. The potentials applied to the anode of the diode 79 and to the cathode of the diode 99 are the same, and these potentials also establish the DC operating levels for a pair of NPN output transistors 80 and 100. In the absence of any signals being passed by either of the diodes 79 or 99, the potentials on the emitters of the transistors 80 and 100 are equal due to the fact that the emitter resistors 83 and 103 are of equal value and the collectors of the transistors 80 and 100 are connected to the same positive potential source.

Figure 3:
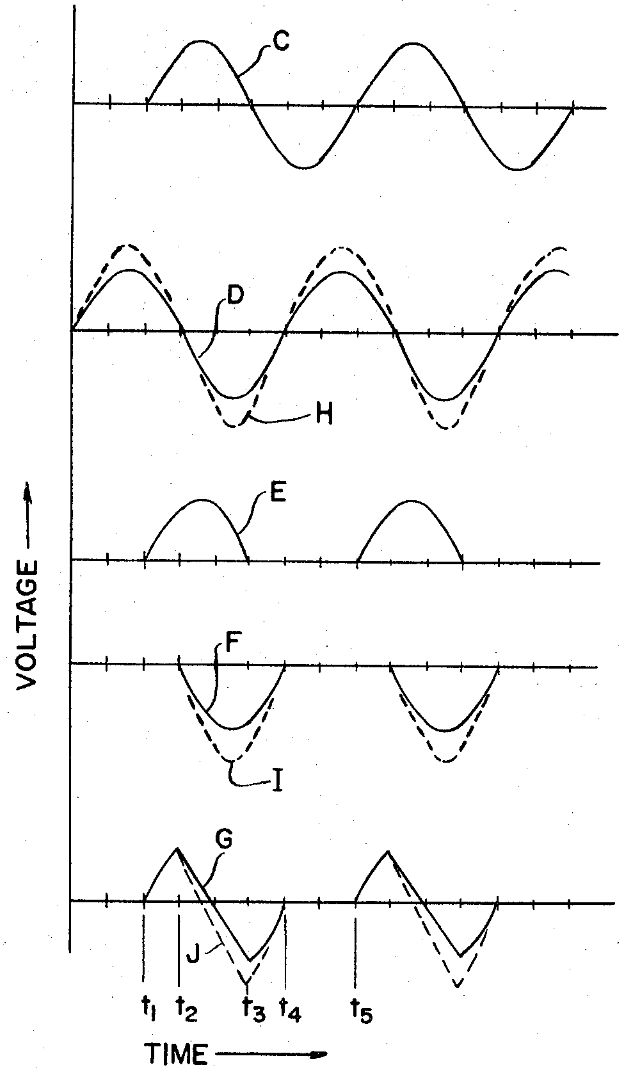
FIG. 3 shows wave-forms useful in explaining the operation of the circuit shown in FIG. 2.

Because of the action of the rectifier 99, the signals applied from the collector of the transistor 96 to the base of the emitter-follower transistor 100 are in the form of the rectified positive half-cycles of the sine-wave C and are shown in curve E of FIG. 3. Similarly, the signals applied to the base of the emitter-follower transistor 80 constitute the negative half-cycles of the waveform D and are shown in curve F of FIG. 3. It may be seen that the application of the waveform E causes the transistor 100 to be rendered increasingly conductive as the waveform E increases in amplitude. Conversely, the transistor 80 is rendered decreasingly conductive as the waveform F applied to its base becomes more negative.

The emitters of the transistors 80 and 100 are connected to opposite ends of a potentiometer 110, the tap of which is coupled through an RC circuit, including a resistor 111 and a capacitor 112, to the gate of a field effect transistor 115. Thus, the potential appearing on the tap of the potentiometer 110 determines the conductivity of the field effect transistor 115.

When neither of the diodes 79 and 99 is conductive, the potential on the emitters of the transistors 80 and 100 is equal and is at a predetermined level established by the biasing potential obtained from the voltage dividers connected to the bases of these transistors. This potential may be considered to be the arbitrarily correct hue control potential corresponding to a properly adjusted receiver at a phase tending to balance the received color signals about the I-axis. The source of the field-effect transistor 115 is connected to a source of positive potential and also is connected through a filter capacitor 116 to ground, with the drain of the field-effect transistor being connected to ground through a resistor 117 and to the base of a PNP transistor 119 for controlling the conductivity of the transistor 119. The emitter potential for the transistor 119 is obtained from a voltage divider consisting of a pair of resistors 120 and 121, and the DC potential on the collector of the transistor 119, appearing across a resistor 123 connected between the collector and ground, is applied to the variable hue control circuit 32 to control the phase shift of the color sync oscillator output applied to the phase-shifting circuit 33.

Curve G of FIG. 3 is a representation of the composite signal applied to the tap on the potentiometer 110 as a result of the varying conduction of the transistors 80 and 100 for a balanced signal about the I-axis as demodulated in the demodulators 70 and 90. Between times $t1$ and $t2$, the diode 79 is non-conductive due to the fact that waveform D still is positive with respect to the reference level established on the anode of the diode 79 by the voltage divider 81, 82. During this time interval, however, the diode 99 is conductive, causing an increasing positive potential to be applied to the base of the transistor 100, resulting in increased conductivity of that transistor. This in turn causes the potential on the emitter of the transistor 100 to rise correspondingly in direct proportion to the rectified waveform E between times $t1$ and $t2$. Similarly, the potential obtained from the tap on the potentiometer 110 also rises, due to the fact that the potential on the emitter of the transistor 80, during the time period $t1$ to $t2$, remains unchanged from the pre-established reference level described previously.

At time $t2$, however, the diode 79 begins to conduct the waveform F to the base of the transistor 80, rendering it less conductive, while at the same time the transistor 100 is being rendered increasingly conductive in accordance with the rectified waveform E applied to its base. Thus, between times $t2$ and $t3$, both diodes 79 and 99 are conductive, causing varying amounts of increased potential to appear on the emitter of the transistor 100 in accordance with the waveform E and causing decreasing varying amounts of potential to appear on the emitter of the transistor 80 in accordance with the waveform F. The combination of these changes in potential at the emitters of the transistors 80 and 100, as obtained from the tap of the potentiometer 110, is the generally linear portion of the waveform shown in curve G between times $t2$ and $t3$.

During the time period that the waveform E has a greater amplitude than the waveform F, the curve G is above the AC zero line; and during the time period that the waveform F has a greater amplitude than the waveform E, the curve G is below the AC zero line.

At the time $t3$, the rectifier 99 is back-biased and ceases conduction; so that the signal appearing on the tap of the potentiometer 110 then generally follows the waveform F as appearing on the emitter of the transistor 80. At time $t4$ both of the diodes 79 and 99 are non-conductive until time $t5$, so that the potential on the tap of the potentiometer 110 between times $t4$ and $t5$ once again is the arbitrary reference level as may be seen in curve G of FIG. 3.

If the predominance of the color information is centered about the I-axis as illustrated in FIG. 1, and if the output of the phase shifter 33 applied to the demodulators 70 and 90 also is symmetrical about this I-axis or the axis of predominance of color information, the curves C and D will have equal amplitudes over a period of time but will be displaced in phase as illustrated in FIG. 3. As a consequence, equal portions of the curve G will be above and below the AC reference line; so that the average DC level of the curve G is the same as that which is obtained whenever both of the diodes 79 and 99 are non-conductive, which is the level shown between times $t4$ and $t5$ in FIG. 3.

In order to assure the achievement of proper balance for the signal conditions just mentioned, the tap on the potentiometer 110 is shown as being adjustable, but theoretically, if this tap is placed at the center of the resistor 110, the proper condition should be obtained provided all of the other components in the signal channels from the demodulators 70 and 90 are balanced.

To provide the proper DC control level to the gate of the field effect transistor 115, the RC circuit 111 and 112 is used to integrate the waveform G to produce the DC control signal. The integrating time constant of the circuit 111, 112 is chosen to be relatively long in order to overcome the affects of temporary deviations from the balance of color signals about the I-axis, such as the deviations which occur during a transmission of a color lying a few degrees on either side of the I-axis. At the present time, it would appear that the time constant of the circuit 111 and 112 should be of the order of 1 to 10 seconds, but different signal characteristics of the transmitted signals may cause it to be necessary to employ a time constant which is either longer or shorter than 1 to 10 seconds.

Assume for the moment that constant amplitude color signals exist balanced about the I-axis. If the receiver drifts out of phase for any reason, such as would be caused by an improperly phased burst signal, one of the demodulators 70 or 90 detects signals of greater amplitude than the other of the demodulators over a period of time, since the demodulators then no longer are demodulating signals centered about the I-axis, due to the inaccurately-phased reference signals applied to the inputs thereof. This has been illustrated in FIG. 3 by indicating the output of the demodulator 70 as dotted curve H which is superimposed on curve D.

In the previous discussion, curves C and D were of equal amplitude, but out of phase due to the phase displacement of the reference signals applied to the demodulators 70 and 90. The phase relationships of the curves C and H continues; but because the receiver no longer is properly phased, the demodulator 70 is detecting signals of greater amplitude than the demodulator 90. This is reflected in the rectified signals I being applied to the base of the transistor 80, which in turn causes the resultant curve J to be obtained from the tap of the potentiometer 110.

From an examination of the curve J it may be seen that a greater portion of the energy content of the curve J is in the negative region below the zero line of the AC signal illustrated therein. As a consequence, the DC level of the signal applied to the gate of the field-effect transistor from the RC time delay circuit 111, 112 becomes more negative, rendering the field-effect transistor 115 less conductive. This in turn causes the potential on the base of the transistor 119 to drop, rendering that transistor more conductive to cause a more positive DC control potential to be applied to the DC variable hue control circuit 32. The parameters of the hue control circuit 32 are chosen to cause a phase shift in the signal obtained from the output of the color sync oscillator 31 in a direction which tends to once again cause the outputs of the demodulators 70 and 90 to be equal (in this example, to advance the phase of the signal at the output of the hue control circuit 32).

It should be noted that if the output of the demodulator 90 is of greater amplitude than the output of the demodulator 70, the average DC level obtained from the tap of the potentiometer 110 increases, causing increased conduction of the field-effect transistor 115, which in turn results in decreased conduction of the transistor 119. Thus, a reduced or lower DC control potential is applied to the variable hue control circuit 32 which causes a phase shift in the signal applied to the phase shift circuit 33 in the opposite direction from that just described.

To prevent the presence of the burst component 11 from having an adverse affect on the balance of the signals used in the operation of the automatic hue control circuit 40, the positive blanking pulses 125, obtained from the output of the blanker circuit 21 during the blanking intervals, are applied through an inverter 65 to provide a negative blanking pulse to the base of the transistor 29 during the blanking intervals. The blanking intervals overlap the transmission of the burst component, so that the negative pulse applied to the base of the transistor 29 occurs during transmission of the burst component and the transistor 29 is rendered non-conductive during this time. As a result, no output signals are obtained from the collector of the final IF amplifier transistor 26 during the time that the burst signals are being received. At all other times, the biasing potential obtained from the output of the inverter 65 is of a polarity and magnitude to saturate the transistor 29, essentially coupling the resistors 28 directly to ground.

Referring again to FIG. 1, it should be noted that the demodulators 70 and 90 are caused to be responsive to a "-window" of signals lying an equal number of degrees on each side of the I-axis. As a result, reception of strong color signals in areas outside of the window, such as in the green region, has no affect on the output of the demodulators 70 and 90, since these demodulators are not responsive to signals in this region. Such signals fall in the region such as occurs between times t4 and t5 when the hue control circuit 40 provides an arbitrary output which is selected to be at the theoretical I-axis (as roughly established by the burst signal component). As a consequence, prolonged transmission of color signals lying outside of the window has no affect on the circuit and will not cause it to phase lock onto these signals even though they are of high magnitude.

It is apparent that in order to eliminate the affects of signals outside of or off of the I-axis from adversely influencing the operation of the automatic hue control circuit 40, the window should be made as narrow as possible by causing the outputs $\phi I+A$ and $\phi I-A$ from the phase shift circuit 33 to be as close together as possible. In the illustration, there is a 60° difference between these outputs. Although it may be desirable to have this window be even narrower than the 60° used in the illustration, if the window is made too narrow, there is a danger that it may be possible to cause the control signals to be pulled outside the slope of the narrow window. The circuit then would rapidly pull the receiver out of phase because of an increasing DC control signal level of one polarity or the other being applied to the hue control circuit 32. This is an undesirable condition, so that the desirability of the narrow window must be balanced against the danger of the system being pulled out of phase due to the use of a too narrow window. The particular limits which must be employed have not yet been determined, although a circuit with a window 60° wide, as shown in the illustration, has been operated successfully.

It also is apparent that the circuit is sensitive not only to the phases of the signals applied to the demodulators 70 and 90, but also is sensitive to the amplitudes of the color signals applied to the demodulators 70 and 90. Initially, this may appear to be a disadvantage since the DC variable hue control circuit operation depends upon the amplitude of the waveforms C and D applied to the rectifiers 79 and 99 for its optimum operation. However, at low levels of color saturation, the human eye has been found to have substantially reduced color acuity or perception, with only perception of brightness remaining for extremely low levels of color saturation. Thus, if low saturation color signals are demodulated by the demodulators 70 and 90, the particular phase of the color sync oscillator signal applied from the output of the hue control circuit 32 to the phase shifter circuit 33 is relatively unimportant since the eye is less able to detect improper hues at low levels of saturation. As the saturation of the colors increases, however, the operation of the control circuit 40 becomes more dependable, resulting in a more accurate DC control voltage applied to the variable hue control circuit 32 which in turn causes accurate adjustments of the phase of the oscillator signals supplied to the phase shift circuit 33. Thus, the desired degree of control is obtained for more highly saturated colors of which the eye has good perception.

The relatively long time delay imposed on the control circuit by the characteristics of the RC circuit 111, 112 is necessary, so that the transmission of colors at phases just off the I-axis on either side thereof, but within the window observed by the demodulators 70 and 90, does not cause a hue control shift to be obtained in an attempt to center the predominance of color information on the axis of such colors not lying on the maximum acuity I-axis. If transmission of a color of this type persists for a time period greater than the period of the time delay circuit 111, 112, an undesirable shift in the DC signal applied to the variable hue control circuit will take place. This then will cause a corresponding shift in the hues of all of the reproduced colors due to the shift in the phase of the oscillator signal applied to the phase shift circuit 33.

It is highly unlikely, however, that a prolonged transmission of a predominance of a color of this type for a time period greater than 1 to 10 seconds would ever occur in the normal transmitted television signals. By properly centering the predominance of the received color information about the I-axis through the operation of the automatic hue control circuit 40, the outputs of the red, blue and green demodulators 36, 37 and 38 also are correspondingly adjusted to provide the desired correct hue.

So long as the predominance of color information is that which has been observed as shown in the vectorscope plot of FIG. 1 grouped around a particular axis (the observed axis being the maximum acuity I-axis), the hue control circuit described above operates to automatically and correctly maintain the hue of the reproduced signal, irrespective of variations in the phase relationship of the burst signal with the modulated color information signal. The burst signal which is applied to the color sync oscillator establishes what may be considered to be a rough tuning or rough adjustment of the phase of the color sync oscillator, while the automatic hue control circuit 40 then may be considered to provide for the fine tuning or fine adjustment of the hue control in accordance with the desired condition of centering the predominance of color information symmetrically about the I-axis. It should be noted that the control of the relative phase relationship between the output of the color sync oscillator and the modulated subcarrier signal also may be effected by using the automatic hue control circuit to shift the phase of the subcarrier signal instead of shifting the phase of the oscillator signal as described above.

What is claimed is:

1. In a color television receiver for a composite signal comprising brightness signal components, a subcarrier signal modulated by color difference signals representing hue and saturation at different phases of the subcarrier and a burst component for phase locking the signal of an oscillator of the receiver to control color signal demodulators for the subcarrier at different phases of the oscillator signal, the subcarrier signal having an energy peak which tends to be fixed over a period of time at a particular phase with respect to the oscillator signal but the phase of which is subject to change with undesirable received signal variations causing hue changes in the reproduced television image, an automatic hue control circuit including in combination:

phase responsive circuit means;

a circuit applying the oscillator signal to said phase responsive circuit means as a reference signal phase locked to the burst signal;

a circuit applying the subcarrier signal to the phase responsive circuit means, said phase responsive circuit means including an output circuit to provide a control signal representing the phase difference between the energy peak of the subcarrier signal and the reference signal; and means responsive to the control signal for adjusting the relative phases of the subcarrier signal and the oscillator signal to maintain constant the particular phase of the energy peak.

2. The combination according to claim 1 wherein the means responsive to the control signal shifts the phase of the oscillator output signal.

3. The combination according to claim 1 wherein the phase responsive circuit means includes first and second hue control demodulators and wherein the oscillator signal is supplied to each of the hue control demodulators at different phases displaced by equal amounts from said particular phase.

4. The combination according to claim 3 wherein the circuit for providing a control signal responds to the outputs of each of the demodulators and provides a control signal of a predetermined magnitude when the outputs of the hue control demodulators are of equal magnitudes, said control signal being above said predetermined magnitude when the output of the first hue control demodulator exceeds the output of the second hue control demodulator and said control signal being less than said predetermined magnitude when the output of the first demodulator is less than the output of the second demodulator.

5. In a color television receiver for a composite signal comprising brightness signal components of a television image, a subcarrier signal modulated by color difference signals representing hue and saturation of the image at different phases of the subcarrier and a burst component for phase locking the signal of an oscillator of the receiver to control color signal demodulators for the subcarrier at different phases of the oscillator signal, the subcarrier signal exhibiting a characteristic of a predominance of color information which tends to be balanced over a period of time about a particular phase of the subcarrier, an automatic hue control circuit including in combination:

first and second hue control demodulators;

means for supplying the modulated subcarrier signal to the first and second demodulators;

means for supplying the oscillator output signal to the first demodulator at a first phase which is a predetermined amount greater than said particular phase;

means for supplying the oscillator output signal to the second demodulator at a second phase which is said same predetermined amount less than said particular phase;

means for combining the outputs of the demodulators to produce a control voltage, the value of which is dependent upon the relative amplitudes of the outputs of the demodulators; and means responsive to the control voltage for controlling the relative phases of the modulated subcarrier signal and the oscillator output signal to adjust the hue of the image reproduced by the color television receiver to maintain the predominance of color information balanced about said particular phase.

6. The combination according to claim 5 wherein said receiver further includes means for rendering the first and second hue control demodulators non-responsive to the composite signal received during the interval of the burst component.

7. The combination according to claim 5 wherein the outputs of the demodulators are inverted with respect to one another.

8. The combination according to claim 7 further including a time delay circuit for delaying the changes in the control voltage applied to the control voltage responsive means.

9. The combination according to claim 8 wherein the time delay circuit is an integrating circuit.

10. The combination according to claim 7 further including a pair of half-wave rectifiers oppositely poled with respect to one another with one of the rectifiers connected between the output of the first demodulator and the combining means and the other of the rectifiers connected between the output of the second demodulator and the combining means.

11. The combination according to claim 10 wherein the combining means includes means for supplying outputs of each of the half-wave rectifiers to opposite ends of a potentiometer, having an intermediate tap from which is obtained the control voltage.

12. The combination according to claim 11 wherein the means responsive to the control voltage includes a field-effect transistor having at least a control electrode, with the control voltage being applied to the control electrode of the field-effect transistor to vary the conductivity thereof, and further including phase shift means controlled by the conductivity of the field-effect transistor for shifting the phase of the output signals from the oscillator.

13. The combination according to claim 12 further including an integrating circuit connected between the tap on the potentiometer and the control electrode of the field-effect transistor.

14. The combination according to claim 13 wherein the means connected to each end of the potentiometer each includes an emitter-follower transistor, having at least base and emitter electrodes, the emitters thereof being connected to the opposite ends of the potentiometer and the bases thereof being connected with the outputs of the respective half-wave rectifiers.

15. In color television receiver for a composite signal comprising brightness signal components, a subcarrier signal modulated by color difference signals representing hue and saturation at different phases of the subcarrier, and a burst component for phase-locking the signal of an oscillator of the receiver to control color signal demodulators for the subcarrier at different phases of the oscillator output signal, an automatic hue control circuit including in combination:

first and second hue control demodulators;

means for supplying the modulated subcarrier signal to the first and second demodulators;

means for supplying the oscillator output signal to the first and second hue control demodulators, with the relative phases of the modulated subcarrier signal and the oscillator output signal applied to the first and second hue control demodulators being such as to cause the first demodulator to demodulate the subcarrier signal at a first phase which is a predetermined amount greater than a particular phase, and to cause the second demodulator to demodulate the subcarrier signal at a second phase which is substantially said same predetermined amount less than said particular phase; and means responsive to the outputs of the first and second demodulators for shifting the phases of the modulated subcarrier signals which are between the phases detected by the first and second demodulators toward said particular phase relative to the oscillator output signal.

16. In a color television receiver for a composite signal comprising brightness signal components, a subcarrier signal modulated by color difference signals representing hue and saturation at different phases of the subcarrier, and a burst component for phase-locking the signal of an oscillator of the receiver to control color signal demodulators for the subcarrier at different phases of the oscillator output signal, an automatic hue control circuit including in combination:

first and second hue control circuit means;

means for supplying the modulated subcarrier signal to the first and second hue control circuit means;

means for supplying the oscillator output signal to the first and second hue control circuit means, with the relative phases of the modulated subcarrier signal and the oscillator output signal applied to the first and second hue control circuit means being such as to cause the first hue control circuit means to develop a first control signal for a first phase which is a predetermined amount greater than a particular phase, and to cause the second hue control circuit means to develop a second control signal for a second phase which is substantially said same predetermined amount less than said particular phase; and means responsive to the outputs of the first and second hue control circuit means for effectively shifting the phases of the modulated subcarrier signals which are between the phases detected by the first and second hue control circuit means toward said particular phase relative to the oscillator output signal.

* * * * *